United States Patent
Rohe et al.

(10) Patent No.: US 9,009,410 B2
(45) Date of Patent: Apr. 14, 2015

(54) SYSTEM AND METHOD FOR LOCKING DATA IN A CACHE MEMORY

(75) Inventors: Amos Rohe, Tel Aviv (IL); Alex Shlezinger, Ganei Tiqva (IL)

(73) Assignee: Ceva D.S.P. Ltd., Herzlia Pituach (IL)

( * ) Notice: Subject to any disclaimer, the term of this patent is extended or adjusted under 35 U.S.C. 154(b) by 288 days.

(21) Appl. No.: 13/215,298

(22) Filed: Aug. 23, 2011

(65) Prior Publication Data

US 2013/0054898 A1 Feb. 28, 2013

(51) Int. Cl.
- G06F 12/00 (2006.01)
- G06F 13/00 (2006.01)
- G06F 13/28 (2006.01)
- G06F 12/12 (2006.01)
- G06F 12/08 (2006.01)

(52) U.S. Cl.
CPC ....... *G06F 12/126* (2013.01); *Y10S 707/99938* (2013.01); *G06F 12/0815* (2013.01); *G06F 2212/1016* (2013.01)

(58) Field of Classification Search
CPC .............. G06F 12/126; G06F 12/0815; Y10S 707/99938
USPC .................. 711/118–146, 163, 168
See application file for complete search history.

(56) References Cited

U.S. PATENT DOCUMENTS

| | | | |
|---|---|---|---|
| 5,487,162 A | 1/1996 | Tanaka et al. | |
| 6,643,737 B1 * | 11/2003 | Ono | 711/128 |
| 8,140,823 B2 * | 3/2012 | Codrescu et al. | 711/207 |
| 2002/0046326 A1 | 4/2002 | Devereux | |
| 2003/0004952 A1 * | 1/2003 | Nixon et al. | 707/10 |
| 2003/0120873 A1 * | 6/2003 | Kanaley | 711/141 |
| 2004/0083341 A1 * | 4/2004 | Robinson et al. | 711/133 |
| 2005/0216673 A1 * | 9/2005 | Kumar et al. | 711/138 |
| 2006/0277351 A1 * | 12/2006 | Osanai et al. | 711/3 |
| 2007/0277000 A1 * | 11/2007 | Ohtsuka | 711/133 |

OTHER PUBLICATIONS

European Search Report for Application No. EP 12 18 1156 dated Nov. 2, 2012.

* cited by examiner

*Primary Examiner* — Ryan Bertram
(74) *Attorney, Agent, or Firm* — Pearl Cohen Zedek Latzer Baratz LLP

(57) ABSTRACT

A system and method for locking data in a cache memory. A first processing thread may be operated to run a program requesting data, where at least some of the requested data is loaded from a source memory into a non-empty cache. A second processing thread may be operated independently of the first processing thread to determine whether or not to lock the requested data in the cache. If the requested data is determined to be locked, the requested data may be locked in the cache at the same time as the data is loaded into the cache.

18 Claims, 4 Drawing Sheets

SYSTEM AND METHOD FOR LOCKING DATA IN A CACHE MEMORY

FIELD OF THE INVENTION

The present invention relates to cache memory storage, and more particularly to a system and method for locking data in a cache memory.

BACKGROUND OF THE INVENTION

A cache memory may store data (e.g., locally where it is instantly accessible to a processor) that replicates data stored in other source memories (e.g., externally where it takes many cycles for a processor to retrieve the data). If a processor requests data and the requested data is stored in the cache (e.g., a "cache hit"), the data may be loaded by simply reading the cache, which is relatively fast. Otherwise, if the requested data is not stored in the cache (e.g., a "cache miss"), the data may be fetched from its original source memory, which is relatively slow. Hence, the more requests that are served from the cache, the faster and more efficient the overall system performance.

To transfer new data into the cache memory, data previously stored in the cache may be erased to make room for the new data. In some cases, a set of data may be used repeatedly by a program or application. In such cases, it may be inefficient to repeatedly load and erase the same data in the cache over and over again for each repeated use. Some current systems implement a lock mechanism to "lock" a set of frequently used data into the cache so that it may not be replaced and may be re-used to avoid redundant data transfer. Typically, an entire line of data is locked together in the cache.

Some systems may lock data after the data has already been loaded in the cache. Such systems typically stall a program, preventing the program from accessing the requested data already loaded into the cache, until the lock is executed. The lock mechanism may search all entries in the cache until the target data is found and locked, which may cause the program to incur an interruption penalty of several computational cycles.

To avoid stalling the program, other systems may lock data in a cache only prior to running the program. The cache memory may be emptied (invalidated) and data may be loaded and locked exclusively into the first available slot(s) of the cache prior to running the program. Although such systems avoid lock interruptions that stall a running program, such systems cannot benefit from the lock mechanism during program operation, thereby using extra computational cycles to re-transfer frequently used data into the cache for each repeated use.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings. Specific embodiments of the present invention will be described with reference to the following drawings, wherein:

Figure 1A:
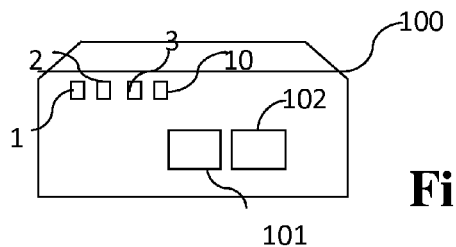
FIGS. 1A-1C are schematic illustrations of exemplary devices according to embodiments of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF EMBODIMENTS OF THE INVENTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well known features may be omitted or simplified in order not to obscure the present invention.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

Conventional cache locking systems are typically software implemented and therefore compete with a software program for processor resources used to load the cache. Some systems set the locking address and lock data prior to running the program, and therefore use processor resources before the program has started, while other systems set the locking address and lock data while the program is running and therefore use processor resources while the program is running, causing the program to stall. Regardless of when the lock is executed, these conventional cache locking systems compete with the program for processor resources and may therefore limit program performance.

According to some embodiments of the invention, a system and method is provided for a hardware implemented locking system, which does not compete with a software program for processor resources and may therefore operate to lock data at any time while the program is running without stalling or stopping the program (e.g., with zero computational penalty). Furthermore, instead of loading and locking data in separate operations, embodiments of the invention may lock data as it is being loaded into the cache memory, "on-the-fly," as part of the data transfer operation. As each new set of requested data is being loaded from a source memory into the cache, a hardware module, e.g., in a cache controller, may lock data in the cache simultaneously or in the same computational cycle.

In another embodiment, instead of operating the locking mechanism separately using a hardware module, some systems may use two separate software threads operated independently of each other, one to run the program (e.g., to retrieve requested data from the cache) and another to operate the lock (e.g., to lock the requested data in the cache). The separate program thread and lock thread may operate independently, for example, using different cores of a multi-core processor, to lock data on-the-fly.

The program thread request for data may trigger a load module, e.g., a cache controller, to load the requested data. In one embodiment, the lock module may be integral to or coupled with the load module (e.g., when both modules are either hardware or software implemented). In such embodiments, these integrated modules may be configured to load and lock data simultaneously. However, in another embodiment, these modules may be separate (e.g., when one module is hardware implemented and the other module is software implemented). In such embodiment, an additional synchronization mechanism may be used to coordinate these modules to simultaneously lock and load the data.

To load the requested data, the load module may read load attributes, for example, from a memory management table, such as, an address control unit (ACU) or memory management unit (MMU). The load attributes may include information for loading the requested data, such as, the address(es) of the requested data in a source memory, whether or not the requested data is cacheable or not cacheable, memory access attributes, etc. The lock module (either hardware or software implemented and operating independently of the program) may use a new attribute: a "lock" attribute to determine whether or not to lock the requested data. When the lock attribute indicates a "yes" (e.g., an attribute bit value of (1)), the data may be pre-designated to be locked and when the lock attribute indicates a "no" (e.g., an attribute bit value of (0)), the data may be pre-designated not to be locked. The lock attribute may be stored together with or separate from the load attributes, for example, in a look-up-table, such as an ACU, MMU, a data register, a data buffer, or may in the program load instructions themselves.

Once the lock module determines whether or not to lock data (e.g., according to the pre-defined lock attribute for the data), the lock module may lock the data as the load mechanism loads the data into the cache, for example, in the same computational cycle. The lock module may lock data loaded in an entry of the cache by setting a lock value to "lock" in a cache table corresponding to the entry. The lock values in the cache table may match the lock attribute values in the data management table for the loaded entries.

Figure 1B:
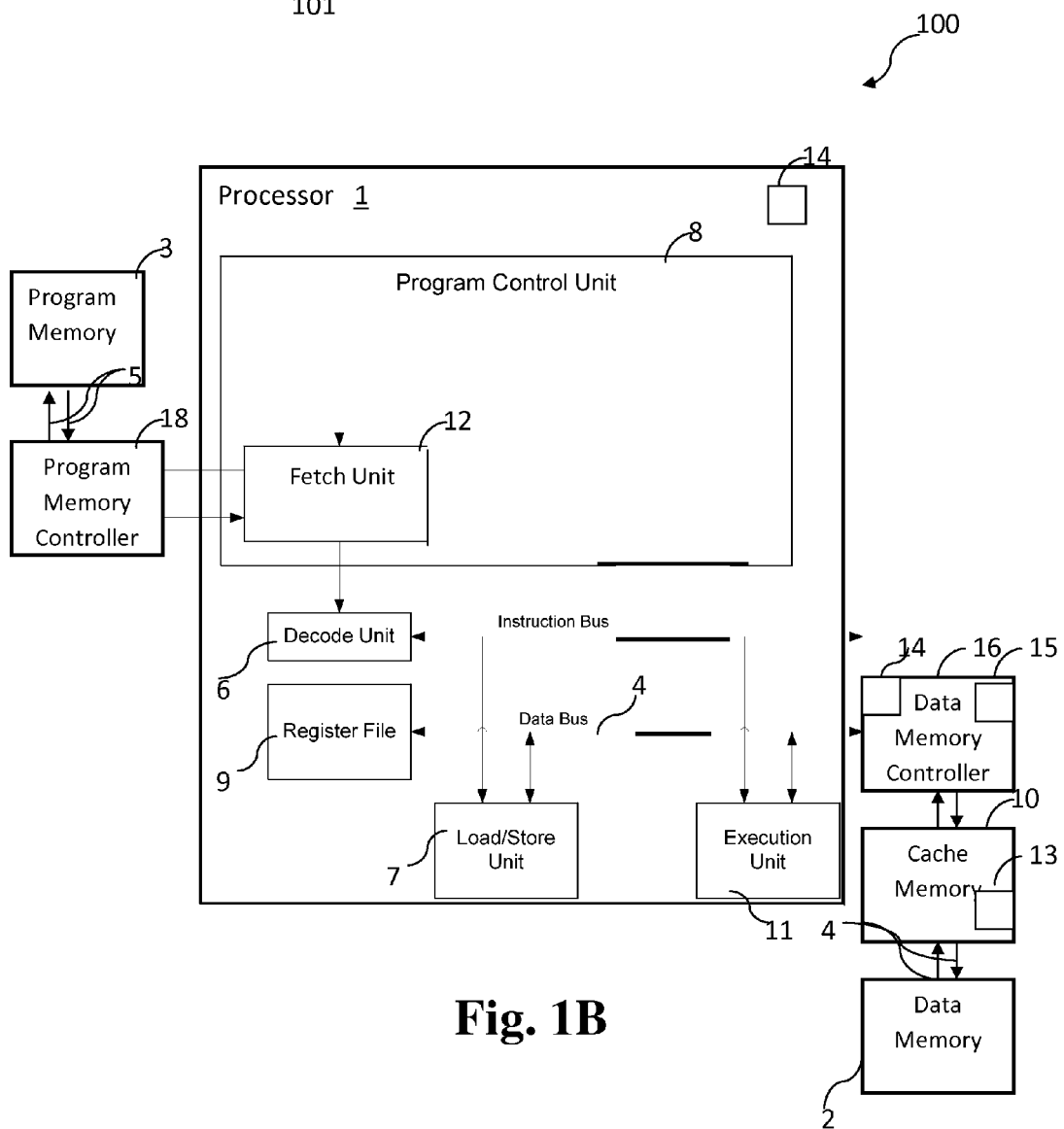
Figure 1C:
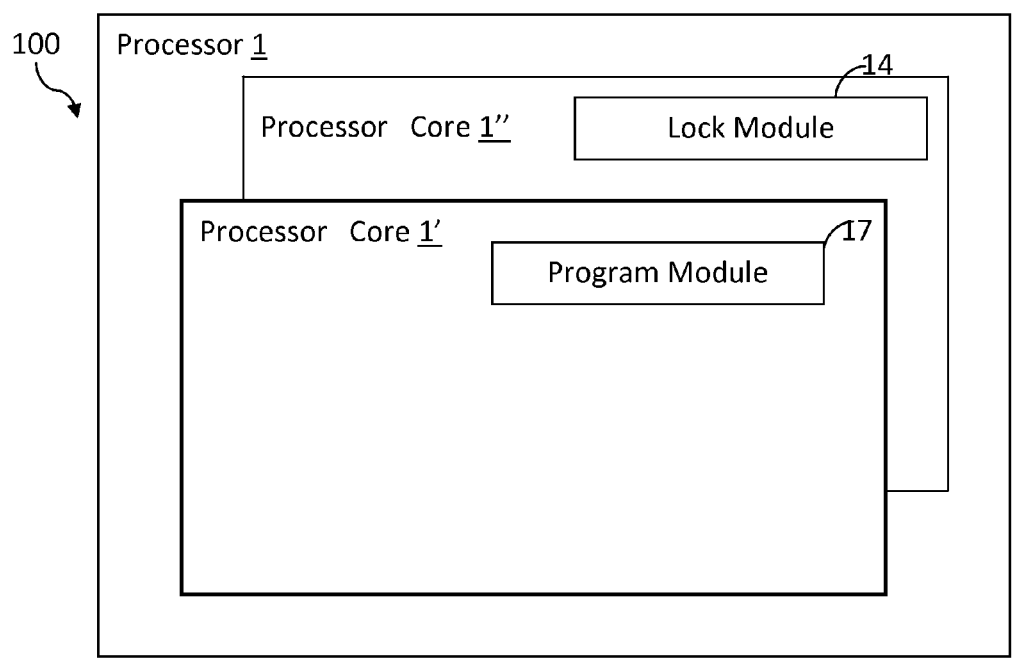

Reference is made to FIGS. 1A-1C, which are schematic illustrations of an exemplary device 100 according to embodiments of the invention. An exemplary device 100 may include a processor 1, a data memory unit 2, a program memory unit 3, and a cache memory 10.

Device 100 may include a computer device, cellular device, or any other digital device such as a cellular telephone, personal digital assistant (PDA), video game console, etc. Device 100 may include any device capable of executing a series of instructions to run a computer program. Device 100 may include an input device 101 for receiving input from a user (e.g., via a pointing device, click-wheel or mouse, keys, touch screen, recorder/microphone using voice recognition, etc.) and an output device 102 (e.g., a monitor or screen) for displaying a program on a user interface according to a sequence of instructions executed by a processor 1.

Processor 1 may include a central processing unit (CPU), a digital signal processor (DSP), a microprocessor, a controller, a chip, a microchip, a field-programmable gate array (FPGA), an application-specific integrated circuit (ASIC) or any other integrated circuit (IC), or any other suitable multi-purpose or specific processor or controller.

Processor 1 may be coupled to data memory unit 2 via a data bus 4 and to program memory unit 3 via a program memory bus 5.

Program memory unit 3 may store a set of instructions and rules for running a computer program while data memory unit 2 may store data used for running the program, such as, pre-generated (i.e. static) data and/or scratch pad (i.e. dynamic) data generated while operating the program instructions; however, other arrangements for storing instructions and data in a memory or memories may be used.

Data memory unit 2 and program memory unit 3 may include, for example, static random access memory (SRAM), dynamic RAM (DRAM), flash memory, or other suitable memory units or storage units, and may use volatile memory or non-volatile memory. Data memory unit 2 and program memory unit 3 may be implemented as separate or integrated memory units. Data memory unit 2 and/or program memory unit 3 may be integrated ("on-chip") or may be separate (i.e., "off-chip"). In one embodiment in which there is a multi-level memory or a memory hierarchy, program memory unit 3 may be off-chip and data memory unit 2 may be on-chip, e.g., an L-1 cache (e.g., which is relatively more integrated with processor 1 than an L-2 cache and typically runs at the clock rate of processor 1) or an L-2 cache (e.g., which is relatively less integrated than the L-1 cache and typically runs at a different rate than the clock rate of processor 1). Other or additional memory architectures may be used.

Cache memory 10 may be a volatile memory, for example, including one or more blocks or lines of data requested, or likely to be requested, by a program or processor 1. Cache memory 10 may replicate data stored in data memory unit 2 (or program memory 3), where processor 1 may retrieve the data relatively faster and at a relatively lower computational cost from cache memory 10 than from data memory unit 2 (or program memory 3). Cache memory 10 may include central processing unit (CPU) cache, disk cache, web cache, or any other type of buffer or cache. Although the example of FIG. 1B shows cache memory 10 operatively connected to data memory unit 2 to store data retrieved therefrom, cache memory 10 may alternatively or additionally be connected to program memory 3 (or any other secondary or external memory unit).

Processor 1 may include a program control unit 8. Program control unit 8 may request, retrieve, and dispatch instructions from program memory unit 3 and may be responsible, in general, for the program pipeline flow. Program control unit 8 may be coupled to a data memory controller 16 via data memory bus 4, and a program memory controller 18 coupled to program memory bus 5 to retrieve data from data memory unit 2 and program memory unit 3, respectively.

Processor 1 may include one or more fetch unit(s) 12 and dispatch unit(s) 6. Fetch unit 12 may fetch a set (e.g., a line) of instructions from program memory 3 in each cycle. Once the instructions are fetched, program control unit 8 may read and extract instruction packets from the fetched instructions and send the instructions to dispatch unit 6. Dispatch unit 6 may dispatch and decode the instructions. Execution unit(s) 11 may execute instructions. Some instructions may request data from data memory unit 2. Load store unit (LSU) 7 may retrieve the requested data, for example, locally from cache memory 10 (relatively quickly) or externally from the original source data memory unit 2 (relatively slowly).

The data requested by the instructions may be retrieved prior to executing the instructions so that the data is available therefore. Data memory controller 16 may load and store the requested data from data memory unit 2 into cache memory 10, where the data may be quickly retrieved for use by processor 1. Data memory controller 16 may be coupled to one or more data management table(s) 15 (e.g., a look-up-table, an ACU, a MMU). Data management table(s) 15 may store load attributes defining information for loading each set of requested data, for example, address(es) of the requested data in data memory unit 2, whether or not the data is cacheable, etc. When cache memory 10 is full, data memory controller 16 may invalidate or empty cache memory 10 to make space to load new data.

A lock module 14 may lock data into cache memory 10 that is frequently used by the program to prevent the data from being replaced when cache memory 10 is emptied. The locked data may remain in cache memory 10 for repeated use by the program. The program may run in a processing thread (e.g., implemented by a software module) and the lock mechanisms may run independently in a separate processing thread (e.g., implemented by a hardware module or a second separate software module). Accordingly, running the lock mechanism may not interrupt or stall the program.

Data memory controller 16 may determine if a set of requested data is already stored and/or locked in cache memory 10. If the requested data is already stored or locked in cache memory 10, the program may retrieve the data directly from cache memory 10, instead of the relatively slower data memory unit 2. However, if the requested data is not stored or locked in cache memory 10, the program may load the data from the original source location in data memory unit 2.

In a separate lock processing thread, for example, on-the-fly or while the data is being loaded from data memory unit 2 into cache memory 10, lock mechanism 14 may determine whether or not to lock the new retrieved data in cache memory 10 and, if so, may execute the lock. Lock mechanism 14 may determine whether or not to lock the data by reading a pre-defined value for a lock attribute associated with the data. A first value (e.g., numeral, numeral range, marker, flag, register state or index) for the lock attribute may indicate that the associated retrieved data should be locked and a second value may indicate that the associated retrieved data should not be locked. The lock attribute values for each set of requested data may be stored in data management table 15, such as, a look-up-table, a memory management buffer, data registers, or may be defined in the load instruction(s) requesting the data. The lock attribute values for each set of requested data may be pre-designated to initiate locking or no locking, for example, based on the frequency or rate of requests for the data in the program, program segment, or line of instructions. If the lock attribute value in data management table 15 indicates the data is to be locked, lock mechanism 14 may set a corresponding lock value in a cache table 13 to a lock setting, thereby locking the data in the associated entry in cache memory 10. For a no lock attribute value, lock mechanism 14 may set a corresponding lock value in a cache table 13 to a no lock setting or may not change the lock value from a default no lock value. Lock mechanism 14 may lock the data in a separate processing thread independently of the program thread using the locked data, for example, to seamlessly lock the data without stalling the program operation.

In some embodiment, instead of dividing loaded data into two categories, one to be locked and another not to be locked, some systems may determine a measure, score, rank, preference or degree of locking along a continuous or finite scale. The measure of locking may be proportional to the frequency or rate of requests for the data in the program. For example, as the frequency or rate of requests for data increases, the locking measure for the data may also increase. Locking mechanism 14 may lock data having an above threshold locking measure. Alternatively, locking mechanism 14 may lock a predetermined amount of data (e.g., into a data bock in cache memory 10 or a separate cache of fixed size pre-designated to store locked data), for example, including data having the highest locking measure relative to other requested data. The predetermined locking threshold or amount of locked data may be set or adjusted, for example, automatically by a processor or by a user, to adjust the amount of locked data or frequency requirement for data to be locked in cache memory 10.

Embodiments of the invention provide a system and method for seamlessly locking data in cache memory 10 while running a program using the same data and without incurring a computational penalty to the program for locking the data.

Lock module 14 may be configured in various hardware and/or software implementations in device 100. In one embodiment of a hardware implementation shown in FIG. 1B, a program may be run by a software module (e.g., processor 1 executing program instructions stored in program memory 3), while the lock mechanism may be run by a hardware module (e.g., lock module 14). Hardware implemented lock module 14 may be disposed in various configurations in device 100, for example, in data memory controller 16 or as a separate execution unit in processor 1. In other embodiments, a software implemented lock mechanism may be used, in which both the program and the lock mechanism may be run by a software module, independently of each other, using separate threads of a parallel processor 1. In one embodiment, processor 1 may include a single core processor with parallel processing capabilities. In another embodiment shown in FIG. 1C, processor 1 may be a multi-core processor including separate processor cores 1' and 1" to implement separate software program module 17 and software lock module 14 to operate different respective processing threads for the program and the lock mechanism, respectively. Similar to lock module 14, data memory controller 16 that loads the requested data may be configured in various hardware and/or software implementations in device 100. When one of data memory controller 16 and lock module 14 is software and the other is hardware, device 100 may use a synchronization mechanism (e.g., a clock, timer, or trigger signals) to synchronize data locking and loading operations (e.g., to occur at the same time or in the same computational cycle). However, when data memory controller 16 and lock module 14 are both either software or hardware, these modules may be configured to synchronize locking and loading without an additional synchronizing mechanism. Other configurations of fully or partially hardware and/or software lock mechanisms 14 and/or data memory controllers 16 may be used.

Figure 2:
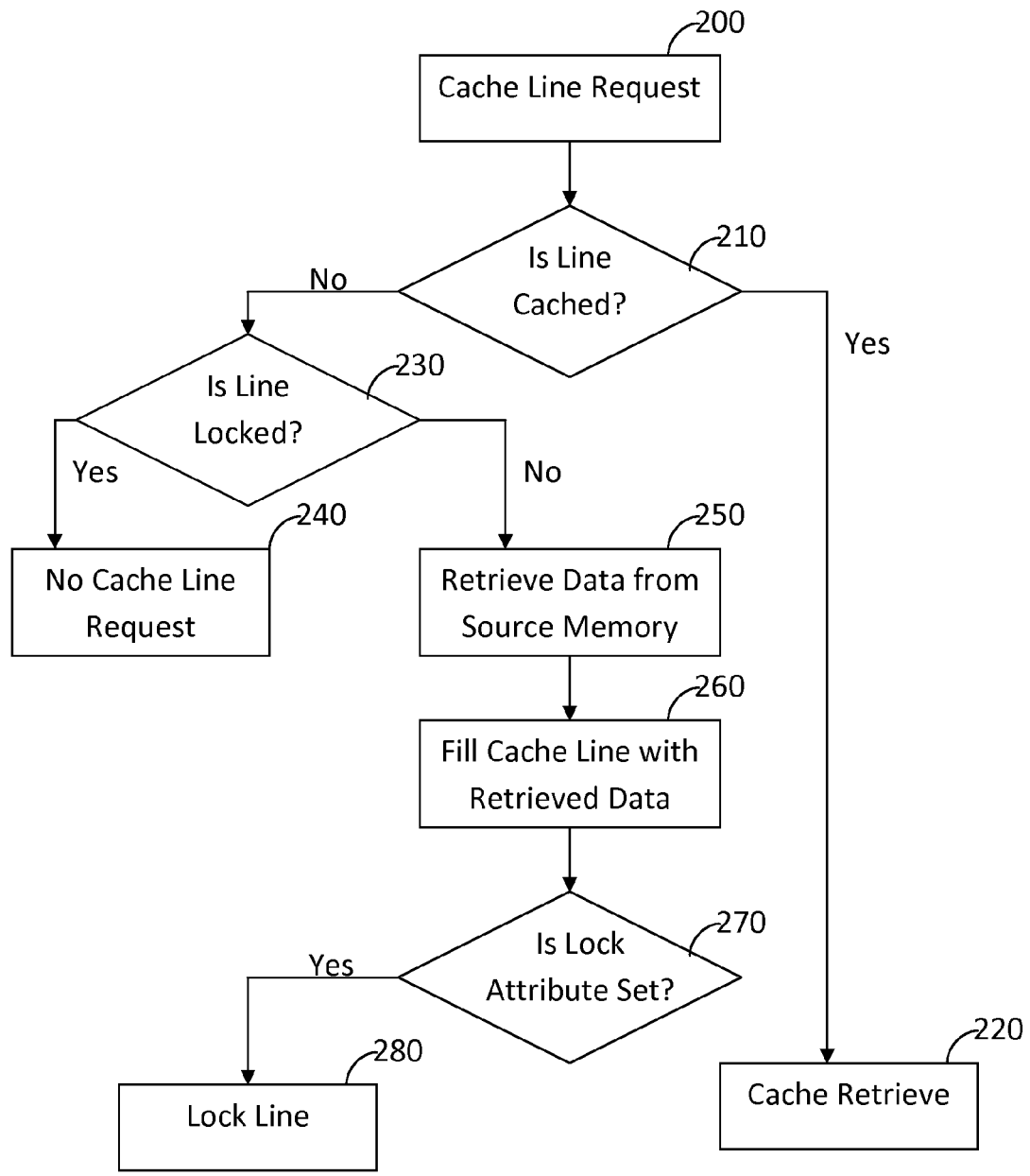
FIGS. 2-3 are flowcharts of methods according to embodiments of the invention.

Reference is made to FIG. 2, which is a flowchart of a method for locking data in a cache memory, according to an embodiment of the invention. A system may include or use components of device 100 of FIGS. 1A-1C to implement the method of FIG. 2.

In operation 200, a processor (e.g., processor 1 of FIGS. 1A-1C) may receive a request for a set (e.g., a line) of data from a cache memory (e.g., cache memory 10 of FIGS. 1A and 1B), such as, in a load instruction of a program. A data memory controller (e.g., data memory controller 16 of FIG. 1B) may read load attribute values for the data from a data management table (e.g., data management table 15 of FIG. 1B), for example, providing information for loading the data, such as, source memory address(es) for the data, whether or not the data is cacheable, etc.

In operation 210, the data memory controller may determine if the requested data is already stored in the cache. If the requested data is already stored in the cache, a process or processor may proceed to operation 220 to request and retrieve the data from the cache. However, if the requested data is not stored in the cache, a process or processor may proceed to operation 230 to attempt to replace the non-requested data stored in the cache with the requested data.

In operation 230, the data memory controller may determine if the data stored in the cache is locked. If the data is locked in the cache, the data cannot be replaced with the requested data and a process or processor may attempt to replace another (sequential) cache entry or proceed to operation 240 to abandon cache storage, for example, transferring the requested data directly from an original data source memory location (e.g., data memory unit 2 of FIGS. 1A and 1B) to the processor without using the cache. However, if the data is not locked in the cache, a process or processor may proceed to operation 250 to load the data into the cache.

In operation 250, the data memory controller may retrieve the requested data from the source memory location, for example, via an external program port (EPP).

In operation 260, the data memory controller may fill the (un-locked) cache location with the requested data retrieved from the source memory. The requested data may simultaneously be served to the processor to complete the data request.

In operation 270, a lock module (e.g., hardware or software implemented lock module 14 of FIG. 1B or 1C), operating independently of the program thread(s) requesting the data, may determine if the requested data should be locked into the cache, for example, by reading lock attribute value(s) for the data. The lock attribute value(s) may be stored in a data management table (e.g., data management table 15 of FIG. 1B). In one example, the lock attribute values may be stored in the same data management table used to store the other load attribute values and all the attribute values may be read at the same time (e.g., in the same operation 200). Alternatively, the lock attribute values may be stored separately, for example, in a separate look-up-table or buffer or may be defined in the cache data request instruction of operation 200. If the lock attribute values indicate that the lock module should not lock the data, for example, with a first pre-defined marker or value (e.g., 0), a process or processor may complete. However, if the lock attribute indicates that the lock module should lock the data, for example, with a second pre-defined marker or value (e.g., 1), a process or processor may proceed to operation 280.

In operation 280, the lock module may lock the requested data into the cache. The cache may be associated with a cache table (e.g., cache table 13 of FIG. 1B) having a lock command for each cache entry (e.g., line). The lock module may set the lock command to a first value to lock the data and a second value (or no value) to not lock the data. The lock command values in the cache table may match the pre-defined lock attribute values in the data management table for the subset of loaded data.

Other operations or orders of operations may be used.

In some embodiments, the lock module and load module of FIG. 2 may be fully hardware implemented, fully software implemented, or a combination of partially hardware and partially software implemented.

Figure 3:
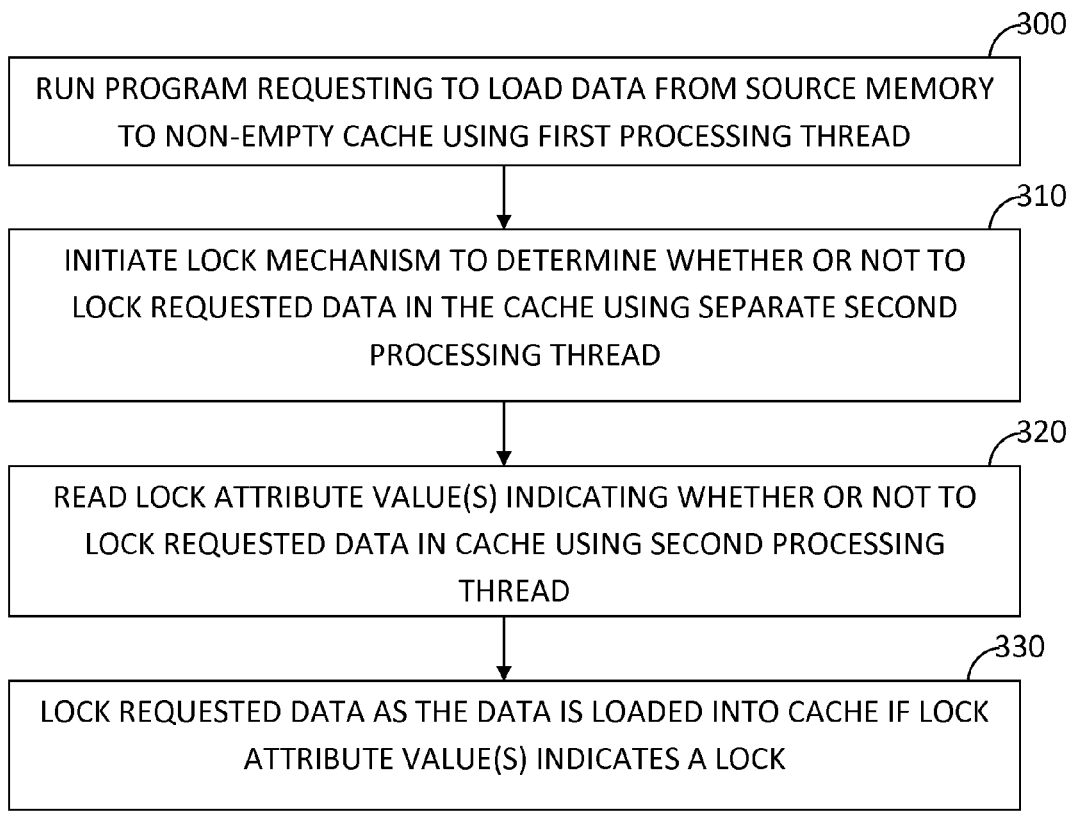

Reference is made to FIG. 3, which is a flowchart of a method for locking data in a cache memory, according to an embodiment of the invention. A system may include or use components of device 100 of FIGS. 1A-1C to implement the method of FIG. 3.

In operation 300, a processor (e.g., processor 1 of FIGS. 1A-1C) may operate a first processing thread using a first software module to run a program requesting data. The program may include a sequence of load instructions, each defining a set of requested data to load from a source memory (e.g., data memory unit 2 of FIGS. 1A and 1B) into a cache memory (e.g., cache memory 10 of FIGS. 1A and 1B). When the program repeatedly requests the same set of data, for example, at a rate or frequency above a predetermined threshold, the data may be pre-designated to be locked so that it is saved in the cache for repeated use. The requested data may be loaded into a non-empty cache, where the non-empty cache may indicate that the program is in-process or running. It may be appreciated that a non-empty cache may indicate an intermediate "in-process" state of the cache and that the cache may be empty before or after that state, in particular, when the program first starts and periodically if it is invalidated.

In operation 310, the processor may initiate a lock module in a second processing thread using a hardware module or a second software module to determine whether or not to lock the requested data in the cache. The second processing thread (for the lock) may be operated independently of the first processing thread (for the program) so that the lock module does not stall the program. The second processing thread may be initiated if the requested data is not already stored or locked in the cache; otherwise the requested data may simply be retrieved from the cache.

In operation 320, the processor may read one or more lock attribute value(s) associated with the requested data that indicate whether or not to lock the requested data in the cache. The lock attribute value may be stored in a look-up-table (e.g., data management table 15 of FIG. 1B) or may be defined in a program load instruction requesting the data.

In operation 330, if the requested data is determined to be locked, the processor may lock the requested data in the cache at the same time as the data is loaded into the cache. Otherwise the processor may store, but not lock, the data.

Other operations or orders of operations may be used.

As it is used herein, a processing "thread" may refer to any sequence of operations or steps, which may be implemented by either hardware or software modules.

As it is used herein, locking and storing/transferring data "at the same time" may refer to locking and storing/transferring data simultaneously to, parallel to, in the same clock cycle as, in sequential/consecutive/overlapping clock cycles or independently.

As it is used herein, locking data "on-the-fly" may refer to locking data seamlessly with, independently of, parallel to, without interruption to, with zero or a below threshold computational penalty to, or so as not to stall or stop, a program requesting the data.

It should be appreciated by a person skilled in the art that although data is described to be locked in a cache memory, embodiments of the invention include locking data in any other type of memory including volatile memory, non-volatile memory, dynamic or static memory, buffers, registers, tables, etc.

It should be appreciated by a person skilled in the art that data may be requested, loaded, stored and/or locked in any size group of individual or multiple data elements in a memory, such as, a line, row, column, data block, single data element, consecutive data elements, non-consecutive data elements, etc.

It should be appreciated by a person skilled in the art that the data referred to in embodiments of the invention may represent information related to any physical or virtual structure, such as, for example, video, image, audio or text data, statistical data, data used for running a program including static and/or dynamic data, etc.

Embodiments of the invention may include an article such as a computer or processor readable non-transitory medium, or a computer or processor storage medium, such as for example a memory, a disk drive, or a USB flash memory, encoding, including or storing instructions which when executed by a processor or controller (for example, processor 1 of FIGS. 1A-1C), carry out methods disclosed herein.

Although the particular embodiments shown and described above will prove to be useful for the many distribution systems to which the present invention pertains, further modifications of the present invention will occur to persons skilled in the art. All such modifications are deemed to be within the scope and spirit of the present invention as defined by the appended claims.

What is claimed is:

1. A method comprising:
operating a first processing thread to run a program requesting data, where at least some of the requested data is loaded from a source memory into a non-empty cache;
operating a second processing thread independently of the first processing thread to determine whether or not to lock the requested data in the cache; and
if the requested data is determined to be locked, operating the second processing thread independently of the first processing thread to lock the requested data in the cache at the same time as the data is loaded into the cache,
wherein locking of the requested data in the cache comprises preventing the requested data from being replaced.

2. The method of claim 1, wherein the requested data is locked on-the-fly at the same time as the data is loaded into the cache for running the program.

3. The method of claim 1, wherein the first processing thread is run by a software module and the second processing thread is run by a hardware module.

4. The method of claim 1, wherein the first and second processing threads are both run by a software module independently of each other in different cores of a multi-core processor.

5. The method of claim 1, wherein the second processing thread determines whether or not to lock the requested data in the cache by reading a pre-designated lock attribute value associated with the requested data.

6. The method of claim 5, wherein the lock attribute value is stored in a look-up-table.

7. The method of claim 6, wherein the look-up-table also stores load attribute values for loading the requested data into the cache, comprising reading the lock attribute value for locking the data and the load attribute values for loading the data in the same operation.

8. The method of claim 5, wherein the lock attribute value for the requested data is defined in a program instruction requesting the data.

9. The method of claim 1, wherein the requested data is pre-designated to be locked based on the frequency or rate of requests for the data in the program.

10. The method of claim 1, wherein the requested data is adapted to be locked at any time during the operation of the program.

11. The method of claim 1, wherein locking the requested data using the second processing thread does not interrupt the program run by the first processing thread.

12. A method comprising:
receiving a request for data from a cache memory;
if the requested data is not already stored or locked in the cache memory, transferring the requested data from a source memory to the cache memory;
reading a lock attribute value associated with the requested data indicating if the requested data is pre-designated to be locked in the cache memory; and
locking the requested data if the lock attribute indicates that the requested data is pre-designated to be locked, wherein locking of the requested data in the cache comprises preventing the requested data from being replaced, wherein the requested data is transferred to the cache memory and locked at the same time and wherein a thread for executing the locking process is operated independently of a thread requesting the data.

13. The method of claim 12, wherein the thread for executing the locking process is implemented by hardware.

14. The method of claim 12, wherein the threads for executing the locking process and requesting the data are implemented by software in parallel processes.

15. A system comprising:
a source memory to store data;
a cache memory to store data replicated from the source memory;
a program module including a first processing thread to run a program requesting data, where at least some of the requested data is loaded from the source memory into the cache memory while the cache memory is not empty; and
a lock module including a first processing thread operating independently of the first processing thread, wherein the lock module is to determine whether or not to lock the requested data in the cache memory and, if the lock module determines to lock the requested data, the lock module is configured to operate the second processing thread independently of the first operating thread to lock the requested data in the cache memory at the same time as the data is loaded into the cache memory, wherein locking of the requested data in the cache comprises preventing the requested data from being replaced.

16. The system of claim 15, wherein the program module and the lock module are separate hardware components.

17. The system of claim 15 comprising a processor, wherein the program module and the lock module are software executed in separate parallel processing threads by the processor.

18. The system of claim 15 comprising a data management table to store lock attribute values, wherein the lock module determines whether or not to lock the requested data by reading a lock attribute value associated with the requested data from the data management table.

* * * * *